United States Patent
Ehrler et al.

(10) Patent No.: US 12,010,943 B2
(45) Date of Patent: Jun. 18, 2024

(54) CONSTRUCTION, RECHARGEABLE BATTERY PACK, AND GARDEN AND/OR FOREST TENDING SYSTEM

(71) Applicant: Andreas Stihl AG & Co. KG, Waiblingen (DE)

(72) Inventors: Denis Ehrler, Wernau (DE); Malte Von Hofen, Stuttgart (DE); Alexander Nordmann, Stuttgart (DE); Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 406 days.

(21) Appl. No.: 16/723,282

(22) Filed: Dec. 20, 2019

(65) Prior Publication Data

US 2020/0220123 A1 Jul. 9, 2020

(30) Foreign Application Priority Data

Jan. 7, 2019 (EP) ..................... 19150504

(51) Int. Cl.
*A01D 34/78* (2006.01)
*A01D 101/00* (2006.01)
(Continued)

(52) U.S. Cl.
CPC ............. *A01D 34/78* (2013.01); *A01G 23/00* (2013.01); *G01K 1/026* (2013.01); *G01K 1/14* (2013.01);
(Continued)

(58) Field of Classification Search
CPC .. H01M 50/213; H01M 50/20; H01M 10/482; H01M 10/486; H01M 2220/30; G01K 1/026; G01K 1/14
See application file for complete search history.

(56) References Cited

U.S. PATENT DOCUMENTS 7,604,507 B1 10/2009 Millon
2009/0022206 A1* 1/2009 Shibuya ................ B60L 3/0046
374/208

(Continued)

FOREIGN PATENT DOCUMENTS

CN 103563122 A 2/2014
CN 104241582 A 12/2014
(Continued)

OTHER PUBLICATIONS

"Hold." Merriam-Webster.com Dictionary, Merriam-Webster, https://www.merriam-webster.com/dictionary/hold. Accessed Oct. 7, 2022. (Year: 2022).*
(Continued)

*Primary Examiner* — Jonathan G Leong
*Assistant Examiner* — Katharine A Caughron
(74) *Attorney, Agent, or Firm* — Crowell & Moring LLP

(57) ABSTRACT

A construction for a battery pack has: a temperature sensor with a sensor head, wherein the sensor head measures a temperature of at least one battery cell via a sensor element and a number of sensor cables contiguous to the sensor head; an assembly body, defining a head disposal region for disposing the sensor head and a cable disposal region contiguous to the head disposal region for disposing a cable portion of the number of sensor cables. The assembly body has a head securing element with a cable conduit. A conduit width of the cable conduit is larger than or equal to a cable width of the disposed cable portion and smaller than a head width of the disposed sensor head such that the head securing element is configured for securing in a form-fitting manner the sensor head disposed in the head disposal region in relation to a movement in the direction of the cable disposal region. The assembly body has a cable securing element. The cable securing element is configured for secur- (Continued)

ing the sensor head disposed in the head disposal region in relation to a movement out of the head disposal region. A cell holder element and the assembly body together with the temperature sensor are configured for mechanically connecting to one another.

21 Claims, 8 Drawing Sheets

(51) Int. Cl.
    *A01G 23/00*    (2006.01)
    *G01K 1/02*     (2021.01)
    *G01K 1/14*     (2021.01)
    *H01M 10/48*    (2006.01)
    *H01M 50/213*   (2021.01)

(52) U.S. Cl.
    CPC ....... *H01M 10/486* (2013.01); *A01D 2101/00* (2013.01); *H01M 10/482* (2013.01); *H01M 50/213* (2021.01); *H01M 2220/30* (2013.01)

(56) References Cited

U.S. PATENT DOCUMENTS

| | | | |
|---|---|---|---|
| 2009/0111015 A1 | 4/2009 | Wood et al. | |
| 2009/0130545 A1 | 5/2009 | Wood et al. | |
| 2010/0028723 A1 | 2/2010 | Haba | |
| 2010/0255355 A1 | 10/2010 | Park et al. | |
| 2010/0320969 A1 | 12/2010 | Sakakibara et al. | |
| 2011/0177372 A1* | 7/2011 | Maguire | H01M 10/14 |
| | | | 429/99 |
| 2012/0009446 A1 | 1/2012 | Mizuguchi | |
| 2013/0011706 A1 | 1/2013 | Wood et al. | |
| 2013/0337299 A1 | 12/2013 | Sugawara | |
| 2014/0227570 A1 | 8/2014 | Hoshi et al. | |
| 2015/0010808 A1 | 1/2015 | Shoji | |
| 2015/0050532 A1 | 2/2015 | Waigel et al. | |
| 2015/0056483 A1 | 2/2015 | Ogasawara et al. | |
| 2015/0132634 A1 | 5/2015 | Sera et al. | |
| 2015/0255773 A1 | 9/2015 | Yoshinari et al. | |
| 2015/0303435 A1 | 10/2015 | Ikeda et al. | |
| 2016/0049703 A1 | 2/2016 | Lobert et al. | |
| 2016/0315359 A1 | 10/2016 | Tyler et al. | |
| 2017/0194771 A1 | 7/2017 | Aoki | |
| 2018/0364108 A1 | 12/2018 | Tanaka et al. | |

FOREIGN PATENT DOCUMENTS

| | | | | |
|---|---|---|---|---|
| CN | 107004792 A | | 8/2017 | |
| CN | 107290072 A | * | 10/2017 | ............... G01K 1/14 |
| CN | 108012571 A | | 5/2018 | |
| CN | 108645525 A | | 10/2018 | |
| CN | 109100038 A | | 12/2018 | |
| DE | 20 2010 012 151 U1 | | 12/2010 | |
| DE | 10 2012 209 174 A1 | | 12/2013 | |
| DE | 10 2015 206 750 A1 | | 10/2015 | |
| JP | 2011-108379 A | | 6/2011 | |
| JP | 2015-201363 A | | 11/2015 | |
| JP | 2016072181 A | * | 5/2016 | |
| JP | 2017058183 A | * | 3/2017 | ............... G01K 7/22 |
| JP | 2018159656 A | * | 10/2018 | ............... G01K 1/08 |
| JP | 2019212531 A | * | 12/2019 | ............... G01K 1/14 |
| WO | WO 2007/050265 A1 | | 5/2007 | |
| WO | WO 2008/038916 A1 | | 4/2008 | |
| WO | WO 2016/171783 A1 | | 10/2016 | |

OTHER PUBLICATIONS

Espacenet machine translation of JP2017058183A (Year: 2017).*
Espacenet machine translation of JP2016072181A (Year: 2016).*
English translation of document B4 (JP 2011-108379 A filed on Dec. 20, 2019) 31 pages.
"Interlock." Merriam-Webster.com Dictionary, Merriam-Webster, https://www.merriam-webster.com/dictionary/interlock—Accessed May 7, 2021 (Year: 2021) (two (2) pages).
European Search Report issued in counterpart European Application No. 19150504.9 dated Jul. 29, 2019 with partial English translation (nine (9) pages).
European Search Report issued in counterpart European Application No. 19150509.8 dated Jul. 29, 2019 with partial English translation (10 pages).
European Search Report issued in counterpart European Application No. 19150519.7 dated Jun. 17, 2019 with partial English translation (10 pages).
U.S. Non-Final Office Action issued in U.S. Appl. No. 16/723,295 dated Aug. 16, 2022 (37 pages).
Chinese-language Office Action issued in U.S. Appl. No. 16/723,295 dated Dec. 28, 2022 (eight (8) pages).
Chinese-language Office Action issued in Chinese Application No. 201911396771.6 dated May 26, 2023 with partial English translation (14 pages).
U.S. Non-Final Office Action issued in U.S. Appl. No. 16/723,295 dated Nov. 6, 2023 (37 pages).

* cited by examiner

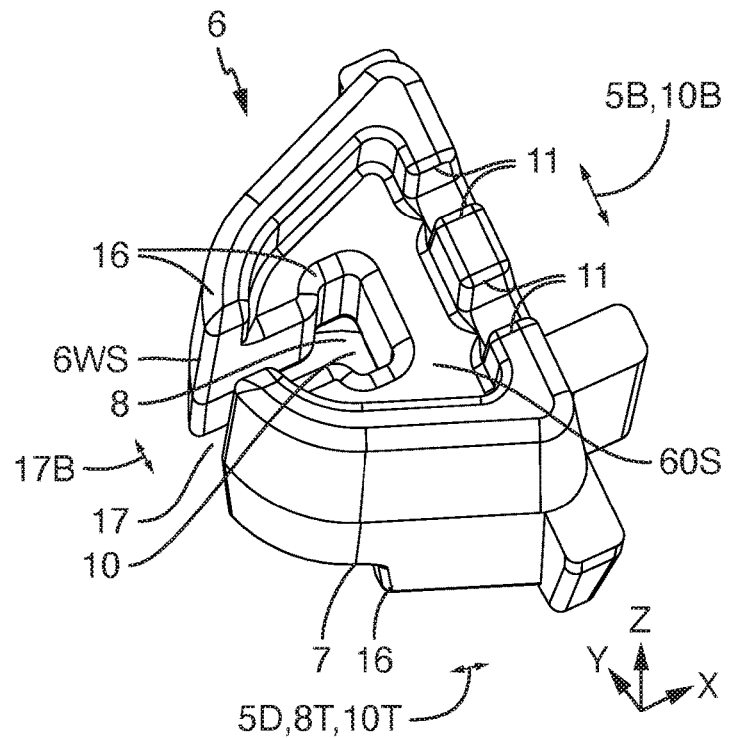
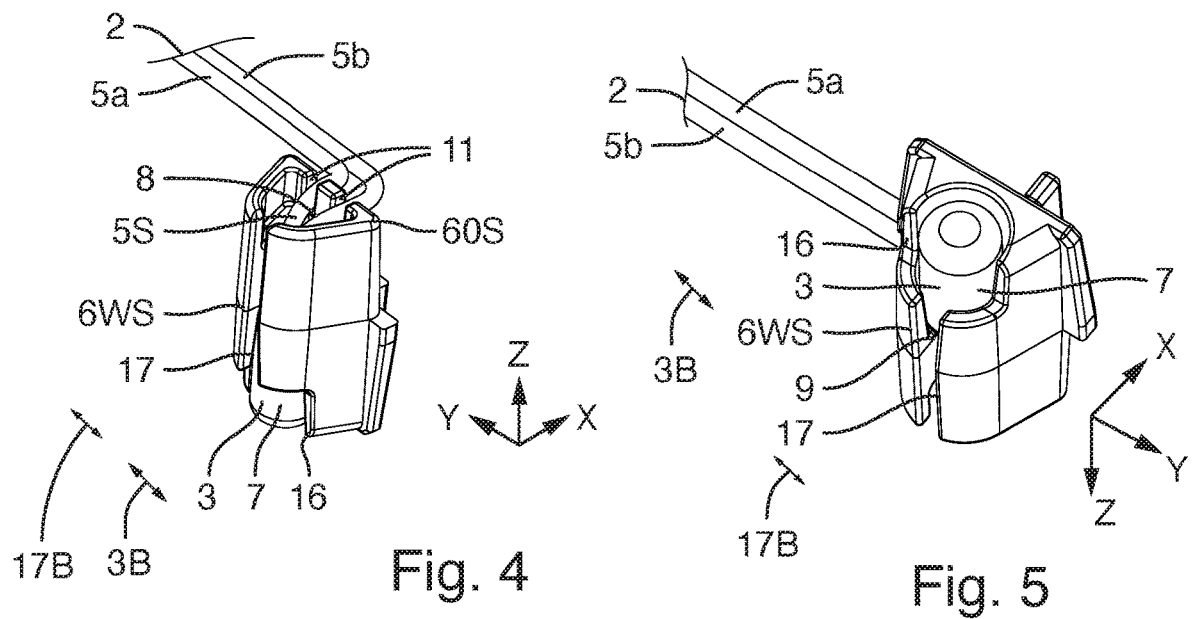

CONSTRUCTION, RECHARGEABLE BATTERY PACK, AND GARDEN AND/OR FOREST TENDING SYSTEM

CROSS REFERENCE TO RELATED APPLICATIONS

This application claims priority under 35 U.S.C. § 119 from European Patent Application No. 19150504.9, filed Jan. 7, 2019, the entire disclosure of which is herein expressly incorporated by reference.

This application contains subject matter related to U.S. application Ser. No. 16/723,295, entitled "Cell Connector Structure, Rechargeable Battery Pack and Gardening and/or Forestry Work System" and U.S. application Ser. No. 16/723,141, entitled "Rechargeable Battery Pack and Gardening and/or Forestry Work System," filed on even date herewith, the entire disclosures of which are herein incorporated by reference.

BACKGROUND AND SUMMARY OF THE INVENTION

The invention relates to a construction for a battery pack for supplying an electrically powered garden and/or forest tending apparatus with an electric power output, to a battery pack having such a construction and at least one battery cell, and to a garden and/or forest tending system having such a battery pack and an electrically powered garden and/or forest tending apparatus.

The invention is based on the object of providing a construction for a battery pack for supplying an electrically powered garden and/or forest tending apparatus with an electric power output, wherein the construction enables positive, in particular simple, assembling of a battery pack having such a construction and at least one battery cell, and a garden and/or forest tending system having such a battery pack and an electrically powered garden and/or forest tending apparatus.

The invention achieves this and other objects by providing a construction, a battery pack, and a garden and/or forest tending system, according to the claimed invention.

The construction according to the invention is configured for a battery pack for supplying an electrically powered garden and/or forest tending apparatus with an electric power output. The construction has at least one temperature sensor, at least one assembly body, in particular a receptacle body and/or a pre-assembly body, and, in particular at least, one cell holder element. The temperature sensor has, in particular only, one sensor head and, in particular only, one number, in particular a plurality, of sensor cables which are in particular directly contiguous, in particular mechanically and/or electrically connected, to the sensor head. The sensor head has, in particular only, one sensor element for, in particular automatically, measuring temperature, in particular a value of the temperature, of at least one battery cell. The assembly body defines, or has, respectively in particular only one head disposal region, in particular a head receptacle region, for in particular directly and/or spatially disposing, particularly receiving, in particular only the sensor head. The assembly body furthermore defines, or has, respectively, in particular only, one cable disposal region, in particular a cable receptacle region, that for in particular directly and/or spatially disposing, in particular receiving, in particular only one cable portion of the number of sensor cables is contiguous to the head disposal region. Moreover, the assembly body has at least one head securing element having a cable conduit. A conduit width, in particular a value of the conduit width, of the cable conduit is larger than or equal to a cable width, in particular a value of the cable width, of the cable portion disposed in particular in the cable disposal region, and smaller than a head width, in particular a value of the head width, of the sensor head disposed in particular in the head disposal region, in such a manner that the at least one head securing element is configured for securing, in particularly in a direct form-fitting manner, the sensor head disposed in the head disposal region in relation to a movement in the, in particular straight, direction of the cable disposal region. The assembly body furthermore has at least one cable securing element. The at least one cable securing element is configured for securing, in particular in a direct manner, the cable portion disposed in the cable disposal region in relation to a movement for in particular in a direct manner securing the sensor head disposed in the head disposal region in relation to a movement from, in particular out of, the head disposal region. The cell holder element and the assembly body together with the, in particular disposed and secured, or pre-assembled, respectively, temperature sensor are configured for, particularly directly, mechanically connecting to one another.

The above, in particular the splitting of the construction into the components described above, which are in particular separate prior to assembling, enables simple assembling of the construction. Additionally or alternatively, the above, in particular the assembly body, enables that the cell holder element and the temperature sensor can be configured for not directly mechanically connecting to one another, or do not have to be directly mechanically connected to one another. Furthermore additionally or alternatively, the assembly body enables the temperature sensor be disposed and secured in a simple manner.

The construction can in particular have a plurality of temperature sensors and/or an, in particular identical, plurality of assembly bodies.

Additionally or alternatively, the sensor element can be an electric, in particular electronic, construction element. Additionally or alternatively, the sensor element can be configured for delivering an electrical signal as the measure of the temperature. The sensor element can in particular be a thermistor, in particular a high-temperature conductor.

Furthermore additionally or alternatively, the conduit width of the cable conduit can be larger than or equal to the cable width of the cable portion and smaller than the head width of the sensor head, in particular in a radial direction orthogonal to the direction, or a circumferential direction, respectively. Additionally or alternatively, the head width can be larger than the cable width. Furthermore additionally or alternatively, the temperature sensor, in particular the sensor head, can have a teardrop shape, or a pearl shape respectively.

Furthermore additionally or alternatively, the assembly body and the temperature sensor can be configured for disposing, or introducing, respectively, the sensor head in, in particular into, the head disposal region, in the direction, and/or in particular in a radial direction that is orthogonal to the direction and/or another, or a circumferential direction, respectively.

Furthermore additionally or alternatively, the assembly body and the temperature sensor can be configured for disposing, or introducing, respectively, the cable portion in, in particular into, the cable disposal region in the direction, and/or in particular in a radial direction that is orthogonal to the direction and/or another, or the circumferential direction, respectively.

Furthermore additionally or alternatively, the cable disposal region can be contiguous to the head disposal region in the direction. Additionally or alternatively, the head disposal region can be, in particular completely, on the lower side of the assembly body, in particular of the at least one head securing element, and/or the cable disposal region can be, in particular at least in part or even in full, in the head securing element and/or on an upper side of the assembly body, in particular of the at least one head securing element, that is opposite, or faces away from, respectively, the lower side. Furthermore additionally or alternatively, the at least one head securing element can in part define, or comprise, respectively, the head disposal region and/or the cable disposal region.

Furthermore additionally or alternatively, the at least one head securing element and the sensor head, in particular during the disposal in the head disposal region, or thereafter, respectively, can be configured for, in particular directly, contacting one another, or bearing on one another, respectively.

Furthermore additionally or alternatively, the at least one cable securing element can be configured for securing the cable portion in relation to a movement from, in particular out of, the cable disposal region and/or in and/or counter to the direction, and/or in and/or counter to at least one radial direction that is in particular orthogonal to the direction, or a circumferential direction, respectively. Additionally or alternatively, the at least one cable securing element for securing the cable portion in relation to a movement can be configured for securing the sensor head in relation to a movement counter to the direction and/or in and/or counter to at least one radial direction that is orthogonal to the direction, or a circumferential direction, respectively, and/or away from the at least one head securing element.

Furthermore additionally or alternatively, the assembly body can be dimensionally stable or rigid, respectively in particular in comparison to the cable portion.

Furthermore additionally or alternatively, the cell holder element can be configured for holding, in particular directly, at least one battery cell, in particular an in particular elongate round cell, on at least one cell side, in particular a cell circumferential side. The sensor head that is in particular disposed in the head disposal region, in particular spatially when holding the at least one battery cell, can in particular be disposed in the region of the at least one battery cell, in particular on a, in particular the, cell circumferential side. The assembly body for measuring the temperature of the at least one battery cell can in particular be open, in particular in the region of the at least one battery cell, or have an opening or a recess, respectively.

Furthermore additionally or alternatively, the temperature sensor, the assembly body, and the cell holder element can be different. Furthermore additionally or alternatively, the sensor head and the number of sensor cables can be different. Furthermore additionally or alternatively, the head disposal region and the cable disposal region can be different. Furthermore additionally or alternatively, the at least one head securing element and the at least one cable securing element can be different.

In one refinement of the invention, the head disposal region, the cable disposal region, and the cable conduit are continuously open toward the outside, in particular at least prior to mechanically connecting the cell holder element and the assembly body. This enables that, for disposing the temperature sensor, in particular the sensor head and the cable portion an end/ends of the number of sensor cables which can in particular be opposite the sensor head, or face away from the sensor head, respectively, may not be free, or do not have to be free. The assembly body, in particular the at least one head securing element and/or the at least one cable securing element, can in particular have a slot which in particular runs in the direction and/or a radial direction that is in particular orthogonal to the direction and/or another, or a circumferential direction, respectively.

In one refinement of the invention the construction has a plurality, in particular the, plurality of temperature sensors. The plurality of sensor cables, in particular further cable portions of the plurality of sensor cables that are different from the cable portions, are bundled so as to form at least one cable harness, in particular by means of at least one plug connector, and/or wherein the further cable portions in part or in full form at least one ribbon cable, in particular at least prior to the disposal on the assembly bodies. This enables simple handling of the temperature sensors. In other words, ends of the plurality of sensor cables, in particular of the further cable portions, which can in particular be opposite the sensor heads, or face away from the sensor heads, respectively, may not be free. The temperature sensors, in particular the sensor heads, can in particular be identical, in particular identical in terms of type and/or construction.

In one refinement of the invention, the assembly body has at least one circumferential wall.

The circumferential wall from the at least one head securing element extends and is configured counter to the direction for securing, in an in particular direct, form-fitting manner, the sensor head disposed in the head disposal region in relation to a radial movement, in particular in and/or counter to at least one radial direction that is in particular orthogonal to the direction, or a circumferential direction, respectively.

Additionally or alternatively, the circumferential wall from the at least one head securing element extends and is configured in the direction for securing, in an in particular direct, form-fitting manner, the cable portion disposed in the cable disposal region in relation to a radial movement, in particular in and/or counter to at least one radial direction that is in particular orthogonal to the direction, or a circumferential direction, respectively.

Additionally or alternatively, the cell holder element and the assembly body having the in particular disposed and secured, or pre-assembled, respectively, temperature sensor are configured for introducing the assembly body counter to the direction in, in particular into, the cell holder element. The circumferential wall from the at least one head securing element extends and is configured counter to the direction for delimiting, in particular in a direct manner, the introduction, in particular by way of physically contacting or bearing on the cell holder element, respectively.

This enables an additional safeguard and/or a simple assembly.

In particular, the circumferential wall can in part define, or comprise, respectively, the head disposal region and/or the cable disposal region. In particular, the circumferential wall can at least in part or even in full radially or circumferentially, respectively, surround the sensor head disposed in the head disposal region and/or the cable portion disposed in the cable disposal region. Additionally or alternatively, the assembly body, in particular the circumferential wall, can be open for disposing the sensor head in the head disposal region and/or the cable portion in the cable disposal region, or have an opening or a clearance, respectively. Furthermore additionally or alternatively, the circumferential wall can have a cylindrical shape.

In one refinement of the invention, the cell holder element is configured for securing in an in particular direct, form-fitting manner the sensor head disposed in the head disposal region in relation to a movement from, in particular out of, the head disposal region when or after mechanically connecting the cell holder element and the assembly body to the, in particular disposed and secured, or pre-assembled, respectively, temperature sensor. This enables an additional safeguard. In other words, the assembly body and the temperature sensor may not or do not have to be configured for the disposal when or after mechanically connecting the cell holder element and the assembly body, in particular without the temperature sensor. The cell holder element can in particular be configured for securing the sensor head in relation to a movement counter to the direction and/or in and/or counter to at least one radial direction that is in particular orthogonal to the direction, or a circumferential direction, respectively and/or away from the at least one head securing element, when mechanically connecting the cell holder element and the assembly body together with the temperature sensor. Additionally or alternatively, the cell holder element and the assembly body together with the temperature sensor can be configured for the, in particular spatial, disposal, in particular the introduction, of the assembly body counter to the direction on, in particular into, the cell holder element.

In one refinement of the invention, the assembly body, in particular on an in particular radial circumferential side of the assembly body, has a cable introduction opening for introducing the cable portion in, in particular into, the cable disposal region and/or the cable conduit, in particular in the, in particular other, radial direction. A cable opening width, in particular a value of the cable opening width, of the cable introduction opening and a cable disposal depth, in particular a value of the cable disposal depth of the cable disposal region and/or of the cable conduit are smaller than the cable width, in particular a value of the cable width, and larger than or equal to a cable thickness, in particular a value of the cable thickness, of the cable portion in such a manner that the cable portion, in particular conjointly with the sensor head, is disposed so as to be rotated, in particular orthogonal, in relation to the introduction in particular in the cable disposal region and/or the cable conduit. This enables the cable portion to be additionally secured in relation to movement. The cable opening width can in particular be in the, in particular one, radial direction. Additionally or alternatively, the cable disposal depth can be in the, in particular other, radial direction. Furthermore additionally or alternatively, the cable thickness can be for the introduction in the, in particular one, radial direction and/or in the disposal, or after the disposal, respectively, in the, in particular other, radial direction. Furthermore additionally or alternatively, the cable thickness can be orthogonal to the cable width, and/or be smaller than the cable width. Furthermore additionally or alternatively, the circumferential side can be between the upper side and the lower side.

In one refinement, the at least one cable securing element is configured for securing in an in particular direct, force-fitting manner, in particular for clamping, the cable portion. This enables a simple production of the at least one cable securing element. The assembly body, in particular the at least one cable securing element, in particular may not, or does not need to have, an undercut, or in particular be an undercut.

In one refinement of the invention the assembly body is shaped in such a manner, and the at least one cable securing element is disposed on an, in particular the, upper side of the assembly body in such a spatial manner, that the cable portion disposed in the cable disposal region is routed through the assembly body, or is guided by means of the assembly body, respectively, in an angular, in particular at least orthogonal, manner. This enables the cable portion to be additionally secured in relation to movement.

In one refinement of the invention, the cell holder element and the assembly body together with the temperature sensor are configured for connecting to one another in an, in particular direct, form-fitting manner, in particular for snap-fitting, in particular in a non-releasable snap-fitting manner. This enables a simple, in particular tool-free, assembly. The cell holder element and/or the assembly body can in particular be in each case deformable in an elastic, in particular materially-elastic, manner. Additionally or alternatively, non-releasable can also mean capable of not being disassembled in a destruction-free manner.

In one refinement of the invention, the temperature sensor is configured so as to be integral.

Additionally or alternatively, the assembly body is configured so as to be integral.

Additionally or alternatively, the cell holder element is configured so as to be integral.

The assembly body can in particular be configured so as to be thermally conducting, or does not need to be configured so as to be non-thermally conductive. Additionally or alternatively, the cell holder element can be configured so as to be non-thermally conductive, or does not need to be configured so as to be thermally conductive.

In one refinement of the invention, the cell holder element is configured in each case for holding, in particular directly, a plurality of cell groups, wherein the cell groups on at least one, in particular the, cell side, in particular one, in particular the, cell circumferential side, have in each case a plurality of, in particular the, battery cells, in particular of in particular elongate round cells. The sensor element when or after mechanically connecting the cell holder element and the assembly body with the, in particular disposed and secured, or pre-assembled, respectively, temperature sensor is disposed, in particular in a spatial manner, in particular when holding the plurality of cell groups for, in particularly automatically, measuring the temperature, in particular a value of the temperature, of two of the plurality of cell groups. This enables a relatively minor number, in particular plurality, of temperature sensors. The cell groups can in particular, be defined, in particular in each case, by an electric wiring in series and/or in parallel of the battery cells of said cell groups, in particular by, or by means of, respectively, an in particular respective cell connector.

In one refinement of the invention, the cell holder element is configured for, in particular directly, receiving the number of sensor cables, in particular a further cable portion of the number of sensor cables that is different from the cable portion. The construction has at least one securing unit, in particular a further cable harness, in particular a medium-voltage pickup cable harness. The cell holder element and the securing unit when or after mechanically connecting the cell holder element and the securing unit are configured for, in particular directly, mechanically connecting to one another and for securing in particular in a form-fitting manner the received number of sensor cables, in particular the further cable portion, in relation to a movement from, in particular out of, the cell holder element. This enables an additional safeguard. In other words, the cell holder element and the assembly body together with the temperature sensor when or after mechanically connecting the securing unit and the said holder element, in particular without the assembly body and without the temperature sensor, may not or do not have to be configured for mechanically connecting to one another.

The battery pack according to the invention for supplying an electrically powered garden and/or forest tending apparatus with an electric power output has a, in particular the, construction as described above and at least one battery cell, in particular an in particular elongate round cell, in particular a plurality of battery cells.

The battery pack can in particular have a mass of at most 20 kilograms (kg), in particular of at most 10 kg, in particular of at most 5 kg. Additionally or alternatively, the at least one battery cell can be a single rechargeable electrochemical accumulator element for electric power. Furthermore additionally or alternatively, the at least one battery cell can be a lithium-ion battery cell. Furthermore additionally, the battery cells, where present, can be identical, in particular identical in terms of type and/or construction. Furthermore additionally or alternatively, a length of the round cell can be larger than a diameter of the round cell.

In one refinement of the invention, the battery pack has a measurement electronics part. The measurement electronics part by means of the number of sensor cables for, in particular automatically, measuring the temperature, in particular a value of the temperature, of the at least one battery cell, in particular the plurality of battery cells, where present, is configured for electrically connecting to the sensor element. The measurement electronics part can in particular have at least one further plot connector for electrically connecting, in particular by way of the at least one plug connector, where present. Additionally or alternatively, the measurement electronics part can be configured for, in particular automatically, switching off the battery pack, in particular the supply with electric power output of the garden and/or forest tending apparatus, by way of the measured temperature, in particular in the event of a problem, when exceeding a temperature upper limit value and/or when undershooting a temperature lower limit value.

The garden and/or forest tending system according to the invention has a, in particular the, battery pack as described above and an electrically powered garden and/or forest tending apparatus. The battery pack and the electrically powered garden and/or forest tending apparatus are configured for electrically connecting to one another, for in particular automatically supplying the electrically powered garden and/or forest tending apparatus with an electric power output from the battery pack.

The garden and/or forest tending apparatus can in particular have an electric drive motor. Additionally or alternatively, the garden and/or forest tending apparatus can be a hand-guided, in particular hand-held, or ground-guided, garden and/or forest tending apparatus. In particular hand-guided, in particular hand-held, garden and/or forest tending apparatus can mean that the garden and/or forest tending apparatus can have a mass of at most 50 kg, in particular of at most 20 kg, in particular of at most 10 kg. Furthermore additionally or alternatively, the battery pack and the garden and/or forest tending apparatus can be configured for electrically connecting to one another in particular in a tool-free and/or destruction-free releasable manner, in particular by means of plug connectors. Furthermore additionally or alternatively, the battery pack and the garden and/or forest tending apparatus can be configured for mechanically connecting to one another in particular in a tool-free and/or destruction-free releasable manner. The garden and/or forest tending apparatus can in particular be configured for supporting the battery pack.

In one refinement of the invention, the garden and/or forest tending system has a backpack device. The backpack device is configured for carrying the battery pack in particular on the back of a user. The backpack device and the battery pack can in particular be configured for mechanically connecting to one another in particular in a tool-free and/or destruction-free releasable manner. Additionally or alternatively, the garden and/or forest tending system, in particular the backpack device, can have an electric connection cable for electrically connecting the battery pack and the garden and/or forest tending apparatus to one another.

In one refinement of the invention, the electrically powered garden and/or forest tending apparatus is a saw, a pole-mounted power pruner, a bush cutter, a set of hedge clippers, a hedge trimmer, a blower apparatus, a leaf blower, a pruning tool, an angle grinder, a sweeping apparatus, a brush roller, a sweeping brush, a lawn mower, an aerator, or a set of grass clippers.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows a perspective view of an upper side and a circumferential side of an assembly body of the construction of FIG. 1.

FIG. 4 shows a perspective view of the upper side and the circumferential side of the assembly body of FIG. 3, having the temperature sensor of FIG. 2.

FIG. 5 shows a perspective view of a lower side and a circumferential side of a further assembly body of the construction of FIG. 1, having a further temperature sensor of the construction of FIG. 1.

DETAILED DESCRIPTION OF THE DRAWINGS

Figure 1:
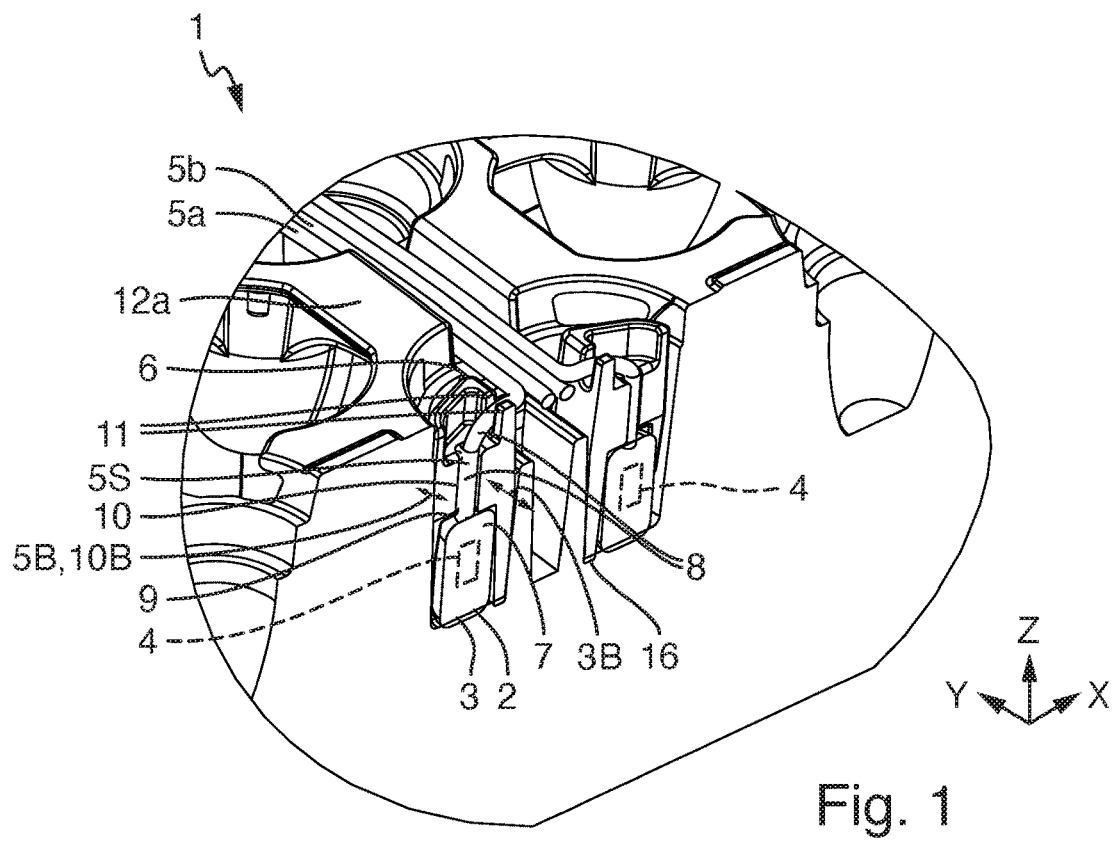
FIG. 1 shows a perspective sectional view of a construction according to the invention.

FIGS. 1 to 16 show a construction 1 for a battery pack 111 for supplying an electrically powered garden and/or forest tending apparatus 101 with an electric power output AL. The construction 1 has at least one temperature sensor 2, at least one assembly body 6, and a cell holder element 12a. The temperature sensor 2 has a sensor head 3 and a number of sensor cables 5a, 5b contiguous to the sensor head 3. The sensor head 3 has a sensor element 4 for measuring a temperature T of at least one battery cell 114a, 114b, 114c. The assembly body 6 defines a head disposal region or head receptacle region 7, respectively, for disposing the sensor head 3. Furthermore, the assembly body 6 defines a cable disposal region or cable receptacle space 8, respectively, contiguous to the head disposal region 7, for disposing a cable portion 5S of the number of sensor cables 5a, 5b. Moreover, the assembly body 6 has at least one head securing element 9 having a cable conduit 10. A conduit width 10B of the cable conduit 10 is larger than or equal to, in the exemplary embodiment shown equal to, a cable width 5B of the cable portion 5S, disposed in particular in the cable disposal region 8, and smaller than a head width 3B of the sensor head 3, disposed in particular in the head disposal region 7, in such a manner that the at least one head securing element 9 is configured for securing in a form-fitting manner the sensor head 3 disposed in the head disposal region 7 in relation to a movement in the direction z of the cable disposal region 8. The assembly body 6 furthermore has at least one cable securing element 11. The at least one cable securing element 11 is configured for securing the cable portion 5S disposed in the cable disposal region 8 in relation to a movement for securing the sensor head 3 disposed in the head disposal region 7 in relation to a movement out of the head disposal region 7. The cell holder element 12a and the assembly body 6 together with the temperature sensor 2 are configured for mechanically connecting to one another.

In detail, the construction 1 has a plurality of temperature sensors 2, in the exemplary embodiment shown has nine temperature sensors 2, as is shown in FIGS. 8, 9, 13, and 14. In alternative exemplary embodiments, the construction can have only a single temperature sensor, or at least two, in particular at least five, in particular at least 10, temperature sensors.

The plurality of sensor cables 5a, 5b, in particular of further cable portions 5S' of the plurality of sensor cables 5a, 5b that are different from the cable portions 5S, are bundled so as to form at least one cable harness 13, in particular by means of at least one plug connector 14, and/or wherein the further cable portions 5S' in part or in full form at least one ribbon cable 15.

In the exemplary embodiment shown, the plurality of sensor cables 5a, 5b are bundled so as to form two cable harnesses 13, in particular by means of two plug connectors 14, and/or wherein the further cable portions 5S' in part or in full form two ribbon cables 15. In alternative exemplary embodiments, the plurality of sensor cables can be bundled so as to form only a single cable harness, in particular by means of only a single plug connector, and/or wherein the further cable portions in part or in full can form only a single ribbon cable, or be bundled so as to form at least three cable harnesses, in particular by means of at least three plug connectors, and/or wherein the further cable portions in part or in full can form at least three ribbon cables.

Furthermore, the temperature sensor 2 in the exemplary embodiment shown has two sensor cables 5a, 5b. The temperature sensor in alternative exemplary embodiments can only have a single sensor cable or at least three sensor cables.

Moreover, the construction 1 in the exemplary embodiment shown has a plurality of assembly bodies 6 which are in particular identical to the plurality of temperature sensors 2.

Furthermore, the assembly body 6 in the exemplary embodiment shown has only a single head securing element 9. The assembly body in alternative exemplary embodiments can have at least two head securing elements.

Moreover, the assembly body 6 in the exemplary embodiment shown has two cable securing elements 11, in particular so as to correspond to the number of sensor cables 5a, 5b. The assembly body in alternative exemplary embodiments can have only a single cable securing element or at least three cable securing elements, in particular so as to correspond to the number of sensor cables.

Furthermore, the assembly body 6 has at least one circumferential wall 16 as is shown in FIGS. 1, 3 to 7, and 11.

The circumferential wall 16 for securing in a form-fitting manner the sensor head 3 disposed in the head disposal region 7 in relation to a radial movement, in particular in and/or counter to at least one, in particular the, radial direction x, y that in particular is orthogonal to the direction z, extends and is configured from the at least one head securing element 9 counter to the direction z.

Additionally or alternatively, the circumferential wall 16 for securing in a form-fitting manner the cable portion 5S disposed in the cable disposal region 8 in relation to radial movement, in particular in and/or counter to the at least one radial direction x, y, extends and is configured from the at least one head securing element 9 in the direction z.

Additionally or alternatively, the cell holder element 12a and the assembly body 6 together with the temperature sensor 2 are configured for introducing the assembly body 6 into the cell holder element 12a counter to the direction z. The circumferential wall 16 for delimiting the introduction extends and is configured from the at least one head securing element 9 counter to the direction z.

Moreover, the assembly body 6, in particular on an in particular radial circumferential side 6WS, or in the circumferential wall 16 of the assembly body 6, respectively has a cable introduction opening 17 for introducing the cable portion 5S into the cable disposal region 8 and/or the cable conduit 10, in particular in the radial direction x, as is shown in FIGS. 3 to 7. A cable opening width 17B of the cable introduction opening 17, and a cable disposal depth 8T, 10T of the cable disposal region 8 and/or of the cable conduit 10, are smaller than the cable width 5B and larger than or equal to a cable thickness 5D of the cable portion 5S in such a manner that the cable portion 5, in particular conjointly with the sensor head 3, in particular in the cable disposal region 8 and/or the cable conduit 10, is disposed so as to be rotated, in particular orthogonal, in relation to the introduction.

The cable introduction opening 17 and the cable conduit 10 in the exemplary embodiment shown conjointly have a T-shape.

Furthermore, the assembly body 6 is shaped in such a manner, and the at least one cable securing element 11 on an upper side 60S of the assembly body 6 is spatially disposed in such a manner, that the cable portion 5S disposed in the cable disposal region 8 is routed through the assembly body 6 in an angular, in particular at least orthogonal, manner, as is shown in FIGS. 1 to 9, and 11 to 14.

Moreover, the at least one cable securing element 11 is configured for securing in a force-fitting manner, in particularly for clamping, the cable portion 5S, as is shown in FIGS. 1, 3, 4, 6, and 11 to 14.

The at least one cable securing element 11 in the exemplary embodiment shown has lateral ribs.

Furthermore, the head disposal region 7, the cable disposal region 8, and the cable conduit 10, and in particular additionally the at least one cable securing element 11 and the circumferential wall 16, are continuously open to the outside, as is shown in FIGS. 3 to 7, and 9.

The assembly body in the exemplary embodiment shown has a slot that runs in the direction z and in the radial direction x.

Figure 2:
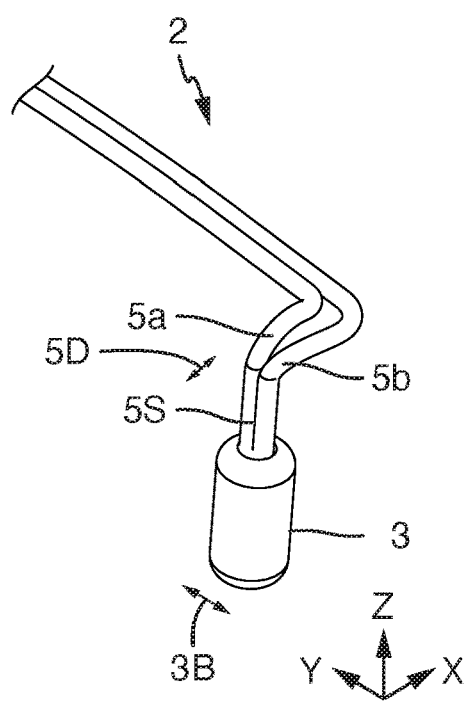
FIG. 2 shows a perspective view of a temperature sensor of the construction of FIG. 1.
Figure 6:
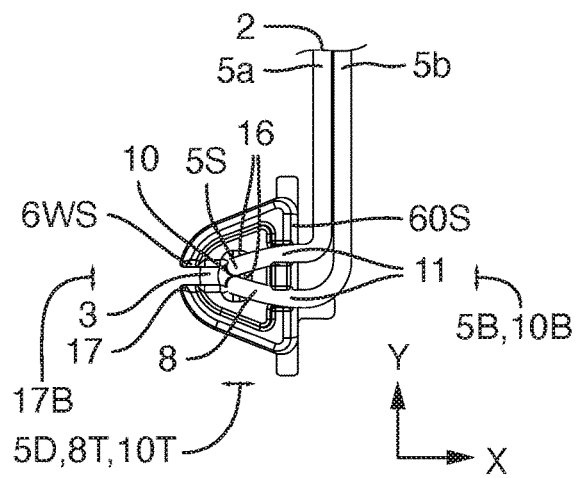
FIG. 6 shows a perspective view of the upper side of the assembly body of FIG. 3, having the temperature sensor of FIG. 2.
Figure 7:
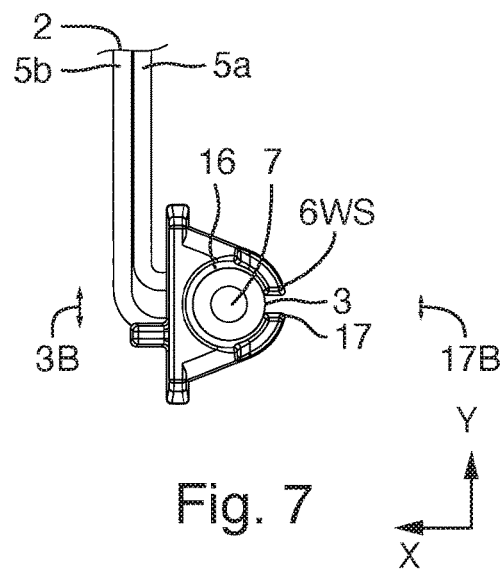
FIG. 7 shows a perspective view of a lower side of the assembly body of FIG. 3, having the temperature sensor of FIG. 2.
Figure 8:
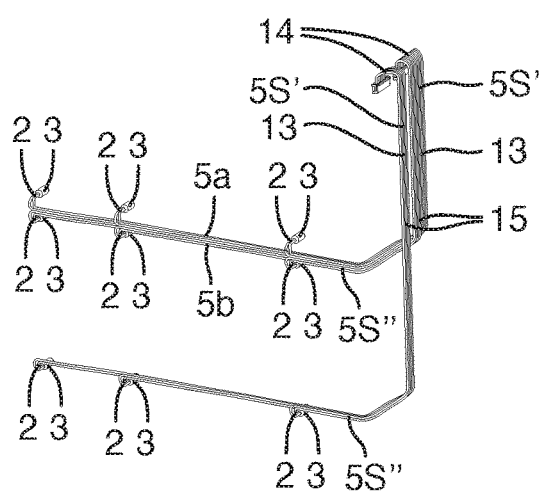
FIG. 8 shows a perspective view of a plurality of temperature sensors of the construction of FIG. 1, bundled so as to form at least one cable harness.
Figure 9:
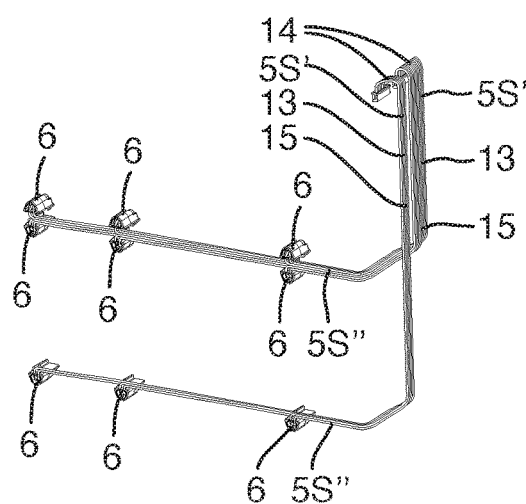
FIG. 9 shows a perspective view of a plurality of assembly bodies of the construction of FIG. 1, having the plurality of temperature sensors of FIG. 8.

In order for the temperature sensor 2 to be disposed on the assembly body 6, one can proceed as follows, as is shown in FIGS. 2 to 4. The temperature sensor 2, in particular conjointly with the sensor head 3, by way of the cable portion 5S is introduced and rotated by way of the cable introduction opening 17, in particular through the latter, and/or in the radial direction x, into the cable disposal region 8 and/or the cable conduit 10. In particular thereafter, the sensor head 3 is introduced into the head disposal region 7, in particular in the direction z and/or by pulling on the number of sensor cables 5a, 5b, in particular on the cable portion 5S, and/or until physically contacting the at least one head securing element 9. In particular thereafter, the cable portion 5S is angled, in particular in the radial direction x. In particular thereafter, the cable portion 5S is introduced in, in particular into, the at least one cable securing element 11, in particular counter to the direction z. The cable portion 5 is thus secured, in particular positionally secured. The sensor head 3 is thus secured, in particular positionally secured. In detail, the sensor head 3 is secured in relation to a movement in the direction z by way of the at least one head securing element 9, counter to the direction z by the cable portion 5, or the at least one cable securing element 11, respectively, and in and/or counter to the radial directions x, y by the circumferential wall 16.

A shape, in particular an internal shape, of the assembly body 6 in the exemplary embodiment shown corresponds to, is in particular identical to, a shape, in particular an external shape of the temperature sensor 2.

Moreover, the temperature sensor 2 is configured so as to be integral, as is shown in FIG. 2.

Additionally or alternatively, the assembly body 6 is configured so as to be integral, as is shown in FIG. 3.

Figure 10:
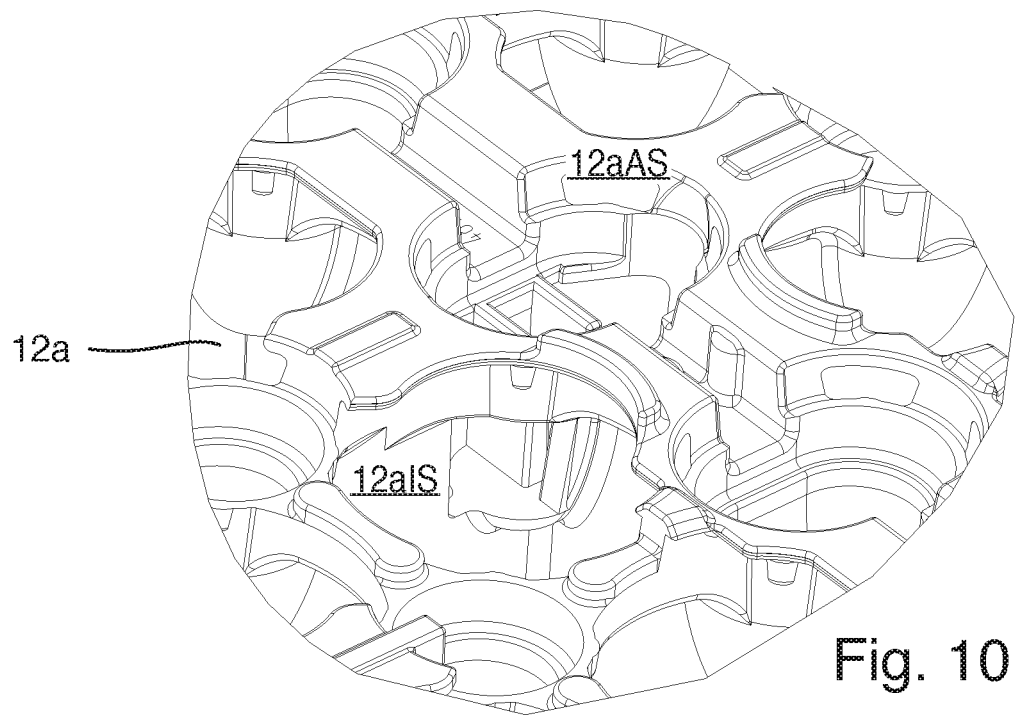
FIG. 10 shows a perspective view of a cell holder element of the construction of FIG. 1.

Additionally or alternatively, the cell holder element 12a is configured so as to be integral, as is shown in FIG. 10.

Furthermore, the cell holder element 12a and the assembly body 6 together with the temperature sensor 2 are configured for connecting to one another in a form-fitting manner, in particular in a non-releasable snap-fitting manner, as is shown in FIGS. 1 and 10 to 14.

Figure 11:
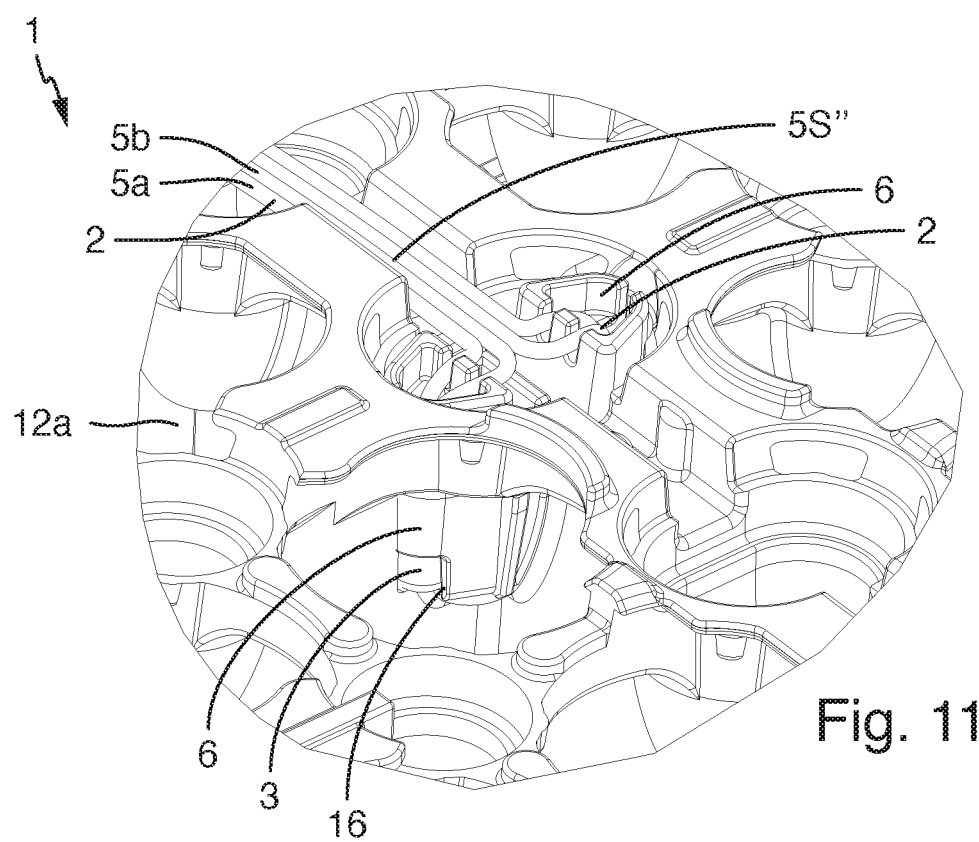
FIG. 11 shows a perspective view of the cell holder element of FIG. 10 when mechanically connecting to the assembly bodies having the temperature sensors of the construction of FIG. 1.

Moreover, the cell holder element 12a when mechanically connecting the cell holder element 12a and the assembly body 6 to the temperature sensor 2 is configured for securing in a form-fitting manner the sensor head 3 disposed in the head disposal region 7 in relation to a movement out of the head disposal region 7, as is shown in FIGS. 1 and 11.

In order for the cell holder element 12 and the assembly body 6 to be mechanically connected to the temperature sensor 2, one can proceed as follows, as is shown in FIGS. 1, 10 and 11. The assembly body 6 together with the temperature sensor 2 is introduced into the cell holder element, in particular counter to the direction z, in particular until mutual physical contact between the circumferential wall 16 and the cell holder element 12a. The cell holder element 12a and the assembly body 6 together with the temperature sensor 2 are thus mechanically connected to one another. The assembly body 6 is thus secured. The temperature sensor 2, in particular the sensor head 3, is thus secured, in particular positionally secured. In detail, the sensor head 3 by the cell holder element 12 is secured in relation to a movement counter to the direction z.

Figure 12:
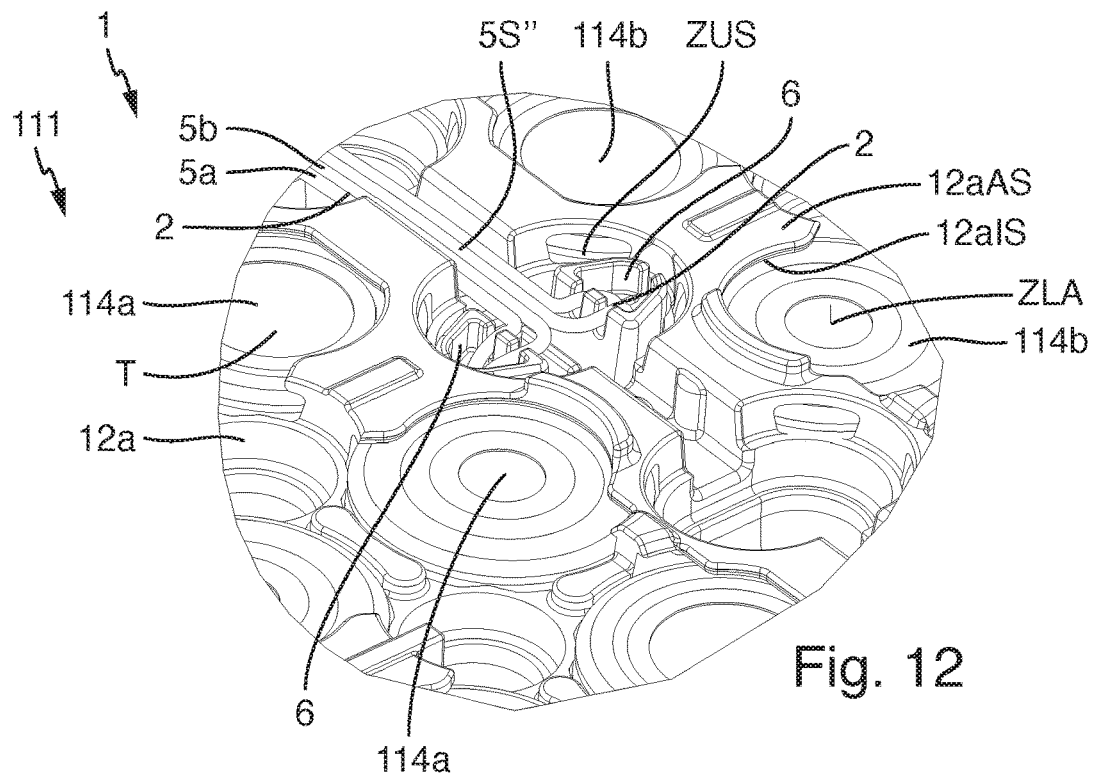
FIG. 12 shows a perspective view of a battery pack according to the invention, having the construction of FIG. 1 and at least one battery cell.

Furthermore, the cell holder element 12a is configured for holding a plurality of cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5, on at least one cell side, in particular a cell circumferential side ZUS, wherein the cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5 have in each case a plurality of battery cells 114a, 114b, 114c, in particular of in particular elongate round cells, as is shown in FIG. 12. The cell holder element 12a in FIGS. 12 to 19 holds the plurality of cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5 on the cell side, in particular the cell circumferential side ZUS. The, in particular at least one, sensor element 4, when mechanically connecting the cell holder element 12a and the, in particular at least one, assembly body 6 to the, in particular at least one, temperature sensor 2, in particular when holding the plurality of cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5, is disposed for measuring the temperature T of two of the plurality of cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5.

The cell holder element 12a in the exemplary embodiment shown is configured for holding fifteen cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5. The cell holder element in alternative exemplary embodiments can be configured for holding at least two, in particular at least five, in particular at least ten, in particular at least twenty, cell groups.

Moreover, the cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5 in the exemplary embodiment shown have in each case six battery cells 114a, 114b, 114c. In alternative exemplary embodiments, the cell groups can have at least two, in particular at least four, in particular at least eight, in particular at least ten, battery cells.

Figure 14:
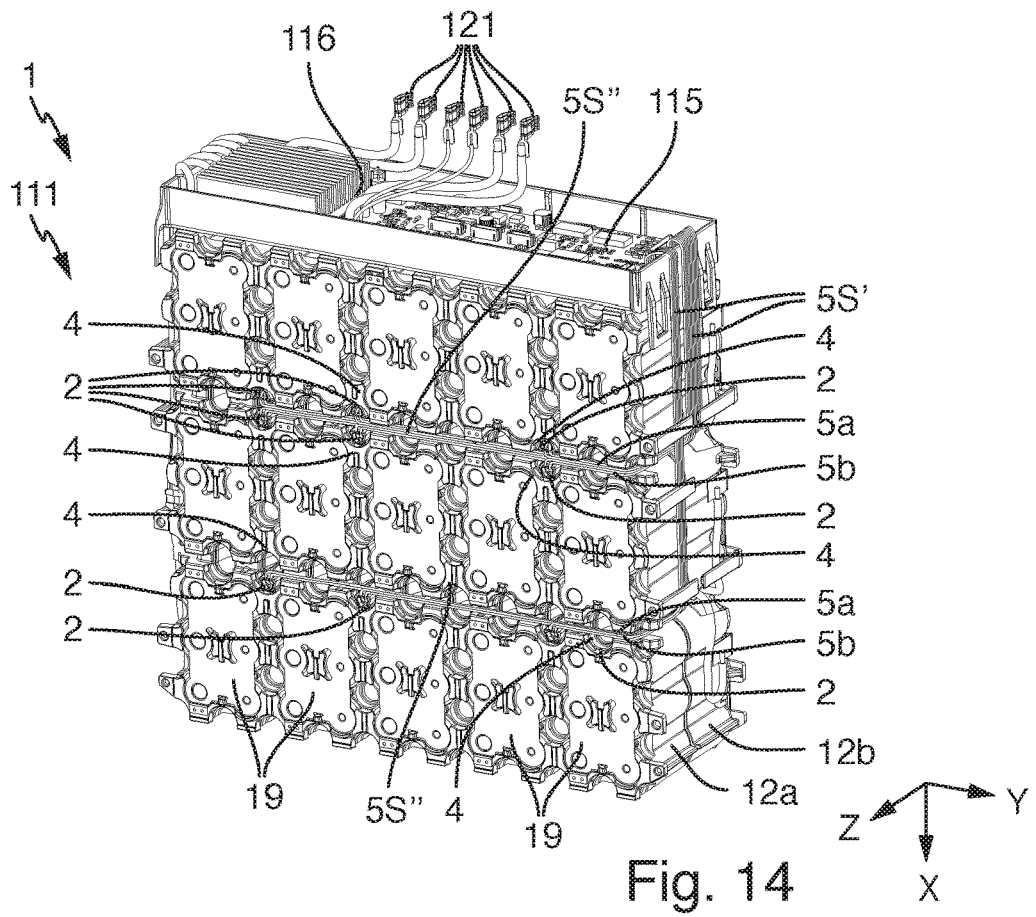
FIG. 14 shows a perspective view of a front side of the battery pack of FIG. 12, having a plurality of cell connectors.
Figure 15:
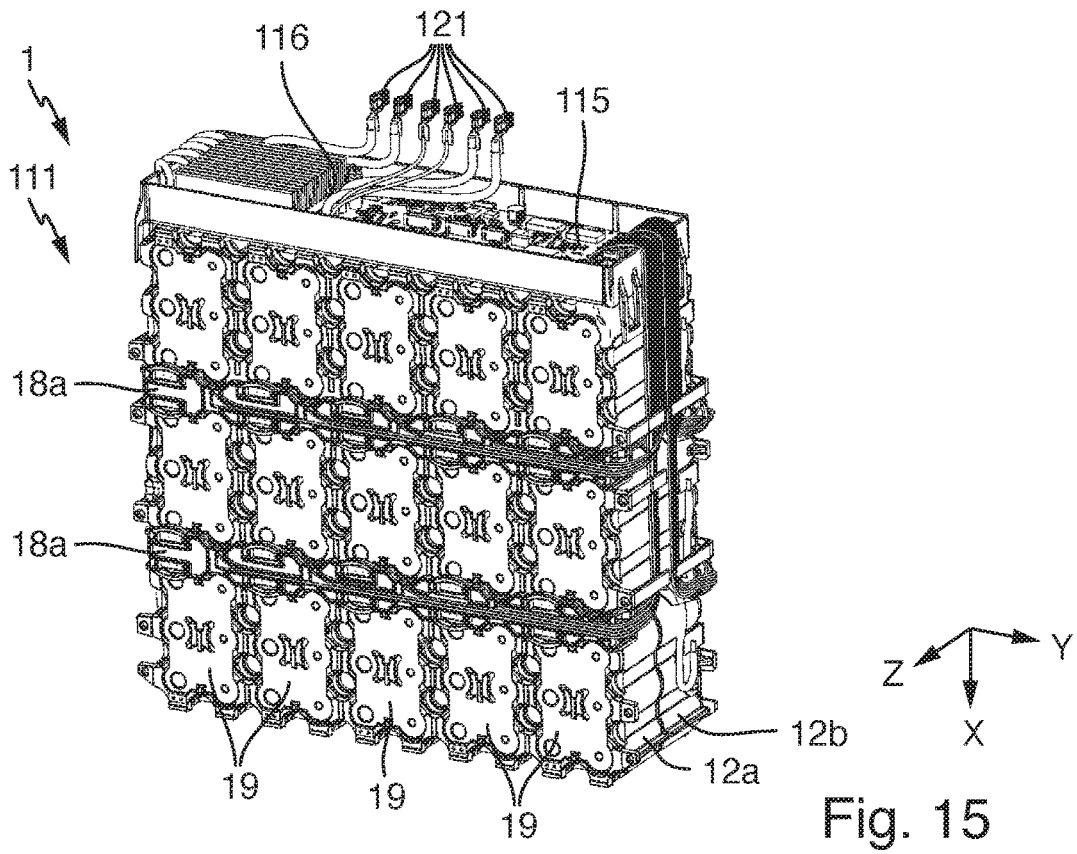
FIG. 15 shows a perspective view of a front side of the battery pack of FIG. 12, having at least one securing unit.

In detail, the cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5 are defined by the battery cells 114a, 114b, 114c thereof being wired in series and/or in parallel, in particular by cell connectors 19 of the construction 1, as is shown in FIGS. 14 and 15.

Figure 13:
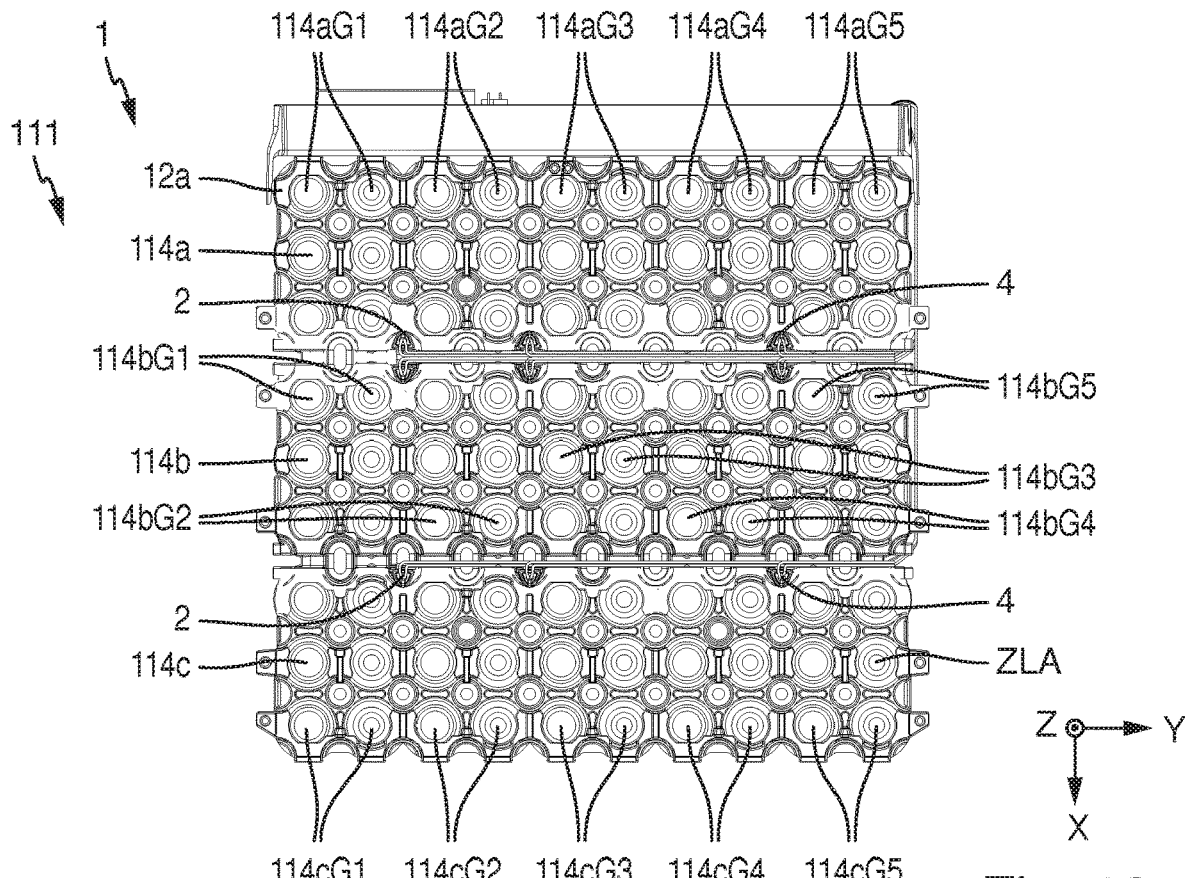
FIG. 13 shows a perspective view of a front side of the battery pack of FIG. 12, having a measurement electronics part.

Furthermore, the sensor element 4 in FIGS. 13 and 14 for measuring the temperature T of the cell groups 114aG1, 114aG2 is disposed at the top left. The sensor element 4 for measuring the temperature T of the cell groups 114aG2, 114aG3 is disposed centrically at the top. The sensor element 4 for measuring the temperature T of the cell groups 114aG4, 114aG5 is disposed at the top right. The sensor element 4 for measuring the temperature T of the cell groups 114bG1, 114bG2 is disposed centrically on the left. The sensor element 4 for measuring the temperature T of the cell groups 114bG2, 114bG3 is disposed centrically in the centre. The sensor element 4 for measuring the temperature T of the cell groups 114bG4, 114bG5 is disposed centrically on the right. The sensor element 4 for measuring the temperature T of the cell groups 114cG1, 114cG2 is disposed at the bottom left. The sensor element 4 for measuring the temperature T of the cell groups 114cG2, 114cG3 is disposed centrically on the bottom. The sensor element 4 for measuring the temperature T of the cell groups 114cG4, 114cG5 is disposed at the bottom right.

Part of the battery cells 114a, 114b, 114c in the exemplary embodiment shown are, in particular spatially, disposed successively, or beside one another, respectively in the direction y, as is shown in FIG. 13. In detail, ten battery cells 114a, 114b, 114c are disposed in the direction y. In alternative exemplary embodiments, at least six battery cells can be disposed in the direction. Moreover, part of the battery cells 114a, 114b, 111c in the exemplary embodiment shown are, in particular spatially, disposed successively, or beside one another, respectively, in the direction x which is in particular orthogonal to the direction y. In detail, nine battery cells 114a, 114b, 114c are disposed in the direction x. In alternative exemplary embodiments, at least six and/or at most 15 accumulator cells can be disposed in the direction. Furthermore, the battery cells 114a, 114b, 114c in the exemplary embodiment shown are, in particular spatially, disposed in the form of round cells having in each case a round cell longitudinal axis ZLA in the direction z, which is in particular orthogonal to the directions x, y.

Moreover, part of the assembly bodies 6 together with part of the temperature sensors 2 in the exemplary embodiment shown are, in particular spatially, disposed in the direction y. In detail, three assembly bodies 6 together with three temperature sensors 2 are disposed in the direction y. In alternative exemplary embodiments, at least one assembly body together with one temperature sensor can be disposed in the direction. Furthermore, part of the assembly bodies 6 together with part of the temperature sensors 2 in the exemplary embodiment shown are, in particular spatially, disposed in the direction x which is in particular orthogonal to the direction y. In detail, three assembly bodies 6 together with three temperature sensors 2 are disposed in the direction x. In alternative exemplary embodiments, at least one assembly body together with one temperature sensor can be disposed in the direction.

In detail, the cell holder element 12a, on an internal side 12aIS of the cell holder element 12a, is configured for disposing, in particular receiving, the battery cells 114a, 114b, 114c in a direction from the inside to the outside, in particular of the construction 1, as is shown in FIGS. 10 to 16. Moreover, the cell holder element 12a of an external side 12aAS of the cell holder element 12a that is opposite the internal side 12aIS of the cell holder element 12a, is configured for disposing, in particular for introducing, in particular the assembly body 6 together with the temperature sensor 2, in the exemplary embodiment shown the assembly bodies 6 together with the temperature sensors 2, in an in particular opposite direction, from the outside to the inside.

Figure 16:
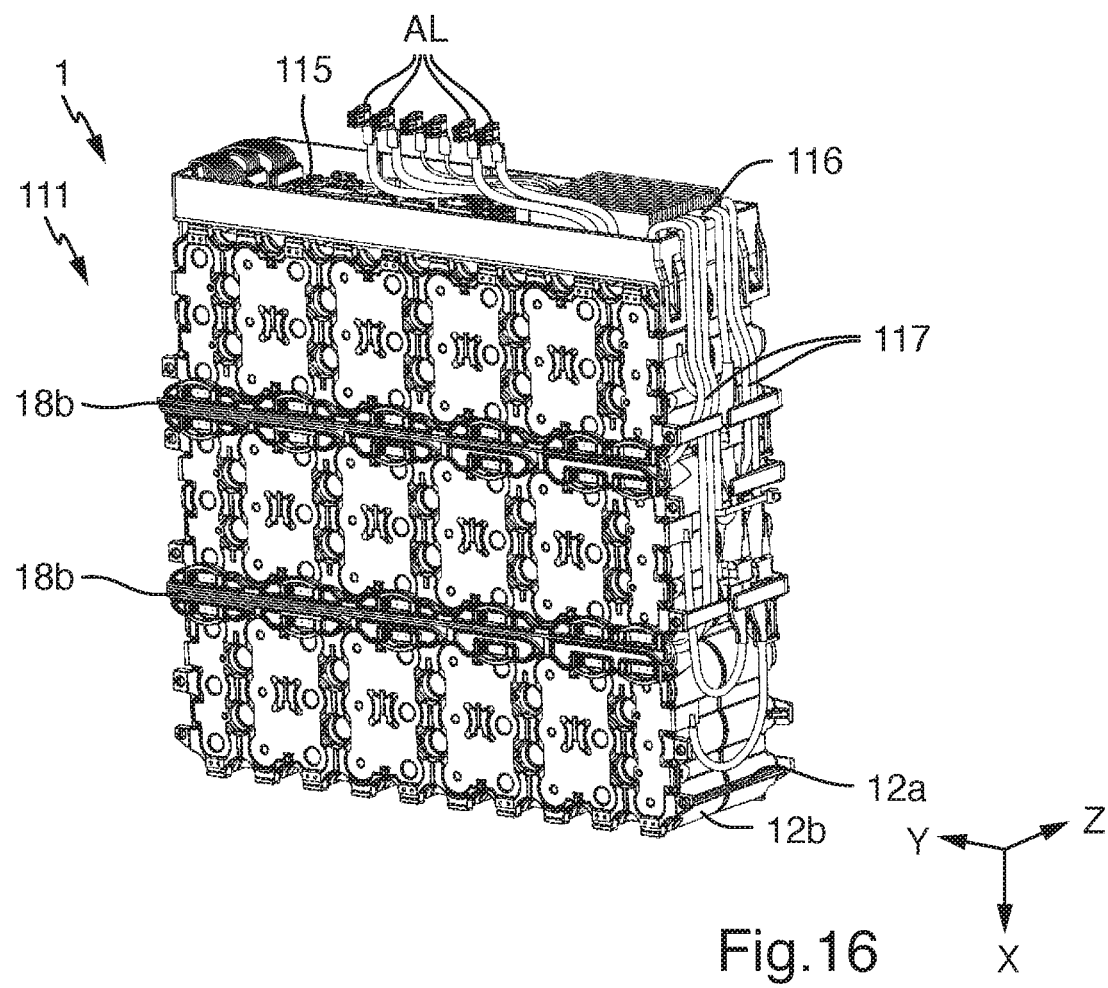
FIG. 16 shows a perspective view of a rear side of the battery pack of FIG. 12.

Furthermore, the construction 1 in the exemplary embodiment shown has a further cell holder element 12b, as is shown in FIGS. 14 to 16. In alternative exemplary embodiments, the construction can have only a single cell holder element or at least three cell holder elements. In the exemplary embodiment shown, the in particular front cell holder element 12a, and the further in particular rear cell holder element 12b, on the cell side, in particular the cell circumferential side ZUS, are configured for holding the plurality of cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5. In FIGS. 12 to 19 the cell holder element 12a and the further cell holder element 12b hold the plurality of cell groups 114aG1, 114aG2, 114aG3, 114aG4, 114aG5, 114bG1, 114bG2, 114bG3, 114bG4, 114bG5, 114cG1, 114cG2, 114cG3, 114cG4, 114cG5 on the cell side, in particular the cell circumferential side ZUS.

Moreover, the construction 1 in the exemplary embodiment shown is cuboid. In detail, the construction 1 in the direction y has a length of 27 centimetres (cm). In alternative exemplary embodiments the construction in the direction can have a length of at least 10 cm and/or of at most 50 cm. Furthermore, the construction 1 in the exemplary embodiment shown in the direction x has a width of 27 cm. In alternative exemplary embodiments the construction in the direction can have a width of at least 9 cm and/or of at most 60 cm. Moreover, the construction 1 in the exemplary embodiment shown in the direction z has a height of 8 cm. In alternative exemplary embodiments, the construction in the direction can have a height of at least 3 cm and/or of at most 20 cm.

Furthermore, the number, in particular the plurality, of sensor cables 5a, 5b, in particular a further cable portion 5S" of the number of sensor cables 5a, 5b, that is different from the cable portion 5S, in particular a plurality of further cable portions 5S", in the exemplary embodiment shown run in the direction y, in particular between the cell connectors 19, as is shown in FIGS. 13 and 14. In alternative exemplary embodiments, the number of sensor cables, in particular further cable portion, can run differently.

Moreover, a number of sensor cables 5a, 5b, in particular a further cable portion 5S', 5S" in the exemplary embodiment shown is configured so as to be longer than another number of sensor cables 5a, 5b, in particular a further, other, cable portion 5S', 5S", in particular either for avoiding an incorrect disposal of a distal temperature sensor 2, in particular of a distal sensor element 4, and of a proximal temperature sensor 2, in particular of a proximal sensor element 4, on the cell holder element 12a, as is shown in FIGS. 8, 9, and 13 to 15. In alternative exemplary embodiments the sensor cables can be of identical length.

Furthermore, the number, in particular the plurality, of sensor cables 5a, 5b in the exemplary embodiment shown is assembled on, in particular in, the cell holder element 12a, or is installed by way of the cell holder element 12a, respectively, as is shown in FIGS. 1, and 11 to 15.

In detail, the cell holder element 12a is configured for receiving the number, in particular the plurality, of sensor cables 5a, 5b, in particular the further cable portion 5S", in particular the further cable portions 5S". The construction 1 has at least one securing unit 18a, in particular a further cable harness, in particular a medium-voltage pickup cable harness, as is shown in FIG. 15. The cell holder element 12*a* and the securing unit 18*a* when mechanically connecting the cell holder element 12*a* and the securing unit 18*a* are configured for mechanically connecting to one another and for securing, in particular in a form-fitting manner, the received number of sensor cables 5*a*, 5*b*, in particular the further cable portion 5S", in relation to a movement out of the cell holder element 12*a*. The cell holder element 12*a* and the securing unit 18*a* in FIG. 15 are mechanically connected to one another and secure the received number of sensor cables 5*a*, 5*b*, in particular the further cable portion 5S", in relation to a movement out of the cell holder element 12*a*.

The construction in the exemplary embodiment shown has two securing units 18*a*. In alternative exemplary embodiments the construction can have only a single securing unit or at least three securing units.

In detail, the cell holder element 12*a* has at least one cable duct 15, in the exemplary embodiment shown two cable ducts 15, for receiving the number of sensor cables 5*a*, 5*b*, in particular the further cable portion 5S".

FIGS. 12 to 19 show a battery pack 111 according to the invention for supplying the electrically powered garden and/or forest tending apparatus 101 with an electric power output AL. The battery pack 111 has the construction 1 and the at least one battery cell 114*a*, 114*b*, 114*c*, in the exemplary embodiment shown the plurality of battery cells 114*a*, 114*b*, 114*c*.

The battery pack 111 furthermore has a measurement electronics part 115, as is shown in FIGS. 13 to 16. The measurement electronics part 115 by means of the number, in particular the plurality, of sensor cables 5*a*, 5*b* for measuring the temperature T of the at least one battery cell 114*a*, 114*b*, 114*c*, in the exemplary embodiment shown the plurality of battery cells 114*a*, 114*b*, 114*c* is configured for electrically connecting to the, in particular at least one, sensor element 4. The measurement electronics part 115 in FIGS. 13 to 19 is electrically connected to the sensor element 4 by means of the number of sensor cables 5*a*, 5*b*.

The measurement electronics part 115 in the exemplary embodiment shown has at least one further plug connector for electrically connecting in particular to the at least one plug connector 14.

Moreover, the in particular at least one sensor head 3, in particular the, in particular at least one, sensor element 4, in the exemplary embodiment shown by means of a heat-conducting adhesive is thermally connected and cast to at least one battery cell 114*a*, 114*b*, 114*c*, in the exemplary embodiment shown the plurality of battery cells 114*a*, 114*b*, 114*c*, in particular when or after being disposed on the assembly body 6, in particular the head disposal region 7, and mechanically connected to the cell holder element 12*a*.

Additionally, the measurement electronics part 115 in the exemplary embodiment shown, for electrically connecting to the battery cells 114*a*, 114*b*, 114*c* by means of the cell connectors 19 and the at least one securing unit 18*a*, in particular the cable harness, in particular the medium-voltage pickup cable harness, is configured for, in particularly automatically, measuring voltages, in particular medium voltages, in particular voltage values, of the battery cells 114*a*, 114*b*, 114*c*. the measurement electronics part 115 in FIGS. 15 and 16 is electrically connected to the battery cells 114*a*, 114*b*, 114*c* by means of the cell connectors 19 and the at least one securing unit 18*a*, in particular the cable harness, in particular the medium-voltage pickup cable harness.

A maximum voltage MXP, in particular of the battery pack 111, in the exemplary embodiment shown is at least 10 Volts (V), and/or at most 500 V, in particular 42 V.

Additionally or alternatively, a maximum electric power output MAL, in particular of the battery pack 111, is at least 50 Watts (W) and/or at most 5 Kilowatts (kW).

Additionally or alternatively, a maximum energy content MEL in particular of the battery pack 111, is at least 80 Watt-hours (Wh) and/or at most 5 Kilowatt-hours (kWh), in particular 1.5 kWh.

The battery pack 111 in the exemplary embodiment shown furthermore has a power electronics part 116, as is shown in FIGS. 14 to 16. The power electronics part 116, by means of in particular the number of sensor cables 5*a*, 5*b* and/or the at least one securing unit 18, in particular the cable harness, in particular the medium-voltage pickup cable harness, various output lines 117, and the cell connectors 19, is configured for electrically connecting to the battery cells 114*a*, 114*b*, 114*c*. The power electronics part 116 in FIG. 16 is electrically connected to the battery cells 114*a*, 114*b*, 114*c* by means of the output lines 117 and cell connectors 19.

The output lines 117 in the exemplary embodiment shown are assembled on, in particular in the at least one cell holder element 12*a*, 12*b*, or are installed by way of the at least one cell holder element 12*a*, 12*b*, respectively, as is shown in FIG. 16.

Moreover, the battery pack 111 in the exemplary embodiment shown has plug connectors 121, in particular for electrically connecting the battery pack 111 to the garden and/or forest tending apparatus 101, as is shown in FIGS. 14 to 16.

Figure 17:
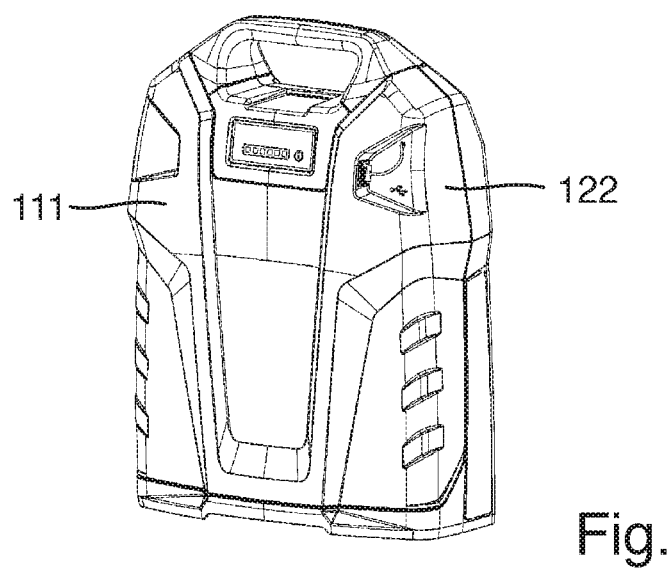
FIG. 17 shows a perspective view of the battery pack of FIG. 12, having a housing.
Figure 18:
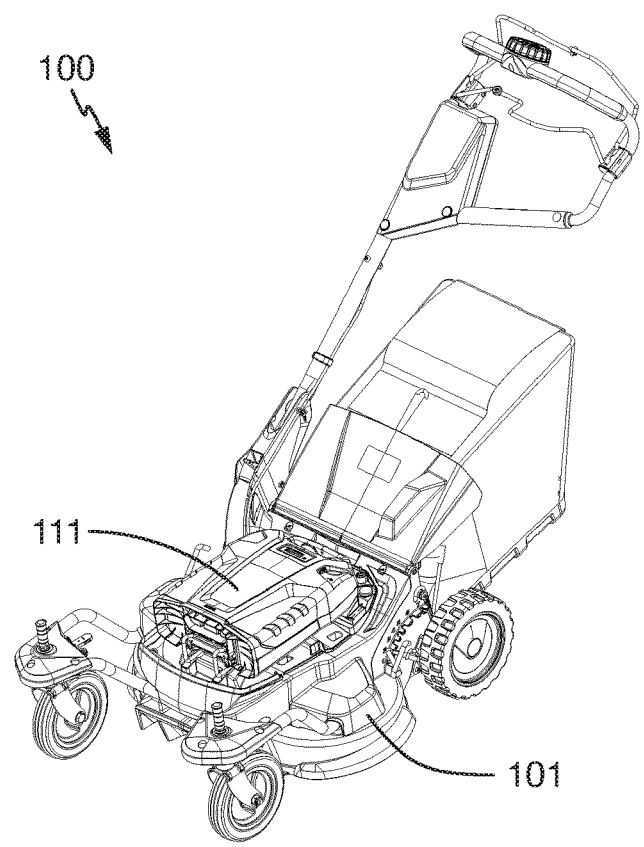
FIG. 18 shows a perspective view of the garden and/or forest tending system according to the invention, having the battery pack of FIG. 12 and an electrically powered garden and/or forest tending apparatus in the form of a lawnmower.
Figure 19:
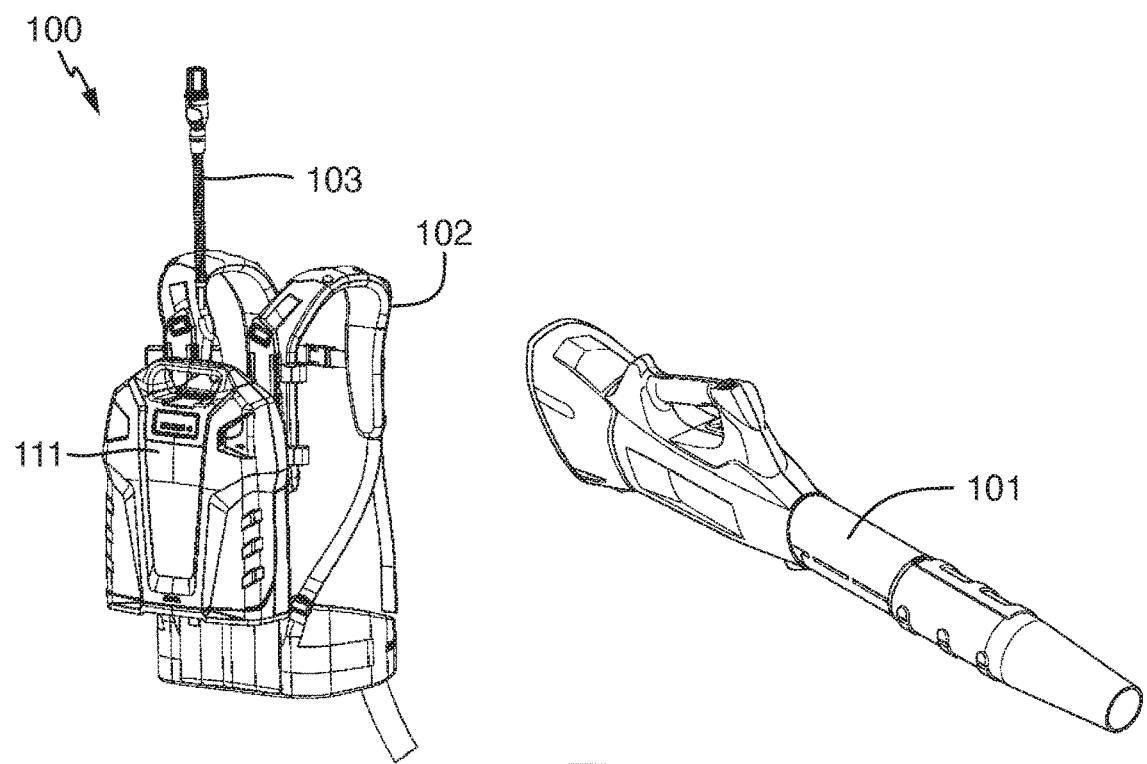
FIG. 19 shows a further perspective view of the garden and/or forest tending system of FIG. 12, having a further electrically powered garden and/or forest tending apparatus in the form of a blower apparatus, and a backpack device for carrying the battery pack of FIG. 12.

Furthermore, the battery pack 111 in the exemplary embodiment shown has a common housing 122, in particular a protective housing, as is shown in FIGS. 17 to 19. The construction 1 and the battery cells 114*a*, 114*c*, 114*c* are, in particular spatially, disposed in the common housing 122. Moreover, the measurement electronics part 115, the power electronics part 116, the output lines 117, and the plug connectors 121 are, in particular spatially, disposed in the common housing 122.

FIGS. 18 and 19 show a garden and/or forest tending system 100 according to the invention. The garden and/or forest tending system 100 has the battery pack 111 and the electrically powered garden and/or forest tending apparatus 101. The battery pack 111 and the electrically powered garden and/or forest tending apparatus 101 are configured for electrically connecting to one another for supplying the electrically powered garden and/or forest tending apparatus 101 with an electric power output AL from the battery pack 111.

The garden and/or forest tending system 100 in the exemplary embodiment shown has two garden and/or forest tending apparatuses 101. In alternative exemplary embodiments, the garden and/or forest tending system can have only a single garden and/or forest tending apparatus or at least three garden and/or forest tending apparatuses.

The garden and/or forest tending apparatus 101 in FIG. 18 is a lawnmower. The garden and/or forest tending apparatus 101 in FIG. 19 is a blower apparatus. In alternative exemplary embodiments, the garden and/or forest tending apparatus can be a saw, a pole-mounted power pruner, a brush cutter, a set of hedge clippers, a hedge trimmer, a leaf blower, a pruning apparatus, an angle grinder, a sweeping apparatus, a brush roller, a sweeping brush, and aerator, or a set of grass clippers.

The lawnmower 101 is configured for supporting the battery pack 111.

Furthermore, the garden and/or forest tending system 100 has a backpack device 102. The backpack device 102 is configured for carrying the battery pack 111.

Additionally, the garden and/or forest tending system 100, in particular the backpack device 102, has an electric connection cable 103 for electrically connecting the battery pack 111 and the garden and/or forest tending apparatus 101, in FIG. 19 the blower apparatus, to one another.

As evidenced by the exemplary embodiments shown and explained above, the invention makes available a construction for a battery pack for supplying an electrically powered garden and/or forest tending apparatus with an electric power output, wherein the construction enables positive, in particular simple, assembling, a battery pack having such a construction and at least one battery cell, and a garden and/or forest tending system having such a battery pack and an electrically powered garden and/or forest tending apparatus.

The construction and/or the battery pack, for example, can be, in particular the number of sensor cables, the securing unit, in particular the further cable harness, in particular the medium-voltage pickup cable harness, the battery cells, the measurement electronics part, the power electronics part, and/or the output lines, for example, can be, in particular spatially disposed, as disclosed in the Applicant's European patent applications 19150509.8 and 19150519.7, filed contemporaneously, the disclosures of said patented applications being fully incorporated as a component part of the disclosure of the present invention by reference.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A construction for a battery pack that supplies an electrically powered garden or forest tending apparatus with an electric power output, comprising:
    at least one temperature sensor having a sensor head, wherein for measuring a temperature of at least one battery cell the sensor head contains a sensor element and a number of sensor cables contiguous to the sensor head;
    at least one assembly body,
        wherein the assembly body defines a head disposal region for disposing the sensor head,
        wherein the assembly body defines a cable disposal region contiguous to the head disposal region for disposing a cable portion of the number of sensor cables,
        wherein the assembly body has at least one head securing element having a cable conduit, wherein a conduit width of the cable conduit is larger than or equal to a cable width of the disposed cable portion and smaller than a head width of the disposed sensor head such that the at least one head securing element is configured for securing in a form-fitting manner the sensor head disposed in the head disposal region in relation to a movement in a direction of the cable disposal region,
        wherein the assembly body has at least one cable securing element, wherein the at least one cable securing element for securing the cable portion disposed in the cable disposal region in relation to a movement is configured for securing the sensor head disposed in the head disposal region in relation to a movement in a counter direction out of the head disposal region,
        wherein the assembly body is made as a single piece, and
    a cell holder element, wherein the cell holder element and the assembly body together with the temperature sensor are configured for directly mechanically connecting to one another,
        wherein the cell holder element is configured for holding at least one battery cell on at least one cell side,
        wherein the temperature sensor, the assembly body, and the cell holder element are different,
        wherein the at least one head securing element and the at least one cable securing element are different,
        wherein the assembly body has at least one circumferential wall,
        wherein the cell holder element and the assembly body together with the temperature sensor are configured for introducing the assembly body into the cell holder element in the counter direction, and
        wherein the circumferential wall, for delimiting the introducing of the assembly body into the cell holder element, extends and is configured from the at least one head securing element in the counter direction, and
    further wherein at least one of:
    (i) the circumferential wall, for securing in a form-fitting manner the sensor head disposed in the head disposal region in relation to a radial movement in at least one radial direction orthogonal to the direction, extends and is configured from the at least one head securing element in the counter direction, or
    (ii) the circumferential wall, for securing in a form-fitting manner the cable portion disposed in the cable disposal region in relation to a radial movement in at least one radial direction orthogonal to the direction, extends and is configured from the at least one head securing element in the direction.

2. The construction according to claim 1, wherein the head disposal region, the cable disposal region, and the cable conduit are continuously open toward outside the assembly body.

3. The construction according to claim 1, further comprising:
    a plurality of said temperature sensors, wherein
    further cable portions of the plurality of sensor cables that are different from the cable portions are bundled so as to form at least one cable harness, or
    the further cable portions in part or in full form at least one ribbon cable.

4. The construction according to claim 3, further comprising at least one plug connector for bundling the further cable portions.

5. The construction according to claim 1, wherein the cell holder element when mechanically connecting the cell holder element and the assembly body to the temperature sensor is configured for securing in a form-fitting manner the sensor head disposed in the head disposal region in relation to a movement out of the head disposal region.

6. The construction according to claim 1, wherein the assembly body for introducing the cable portion into the cable disposal region or the cable conduit on a circumferential side of the assembly body, has a cable introduction opening, and a cable opening width of the cable introduction opening and a cable disposal depth of the cable disposal region or of the cable conduit are smaller than the cable width and larger than or equal to a cable thickness of the cable portion such that the cable portion conjointly with the sensor head is disposed so as to be rotated in relation to the introduction.

7. The construction according to claim 1, wherein the at least one cable securing element is configured for securing in a force-fitting manner the cable portion.

8. The construction according to claim 1, wherein the assembly body is shaped in such a manner, and the at least one cable securing element is disposed on an upper side of the assembly body in such a spatial manner, that the cable portion disposed in the cable disposal region is routed through the assembly body in an angular manner.

9. The construction according to claim 1, wherein the cell holder element and the assembly body together with the temperature sensor are configured for connecting to one another in a form-fitting manner.

10. The construction according to claim 9, wherein the form-fitting manner is a non-releasable snap-fit.

11. The construction according to claim 1, wherein at least one of:
the temperature sensor is configured so as to be integral; or
the cell holder element is configured so as to be integral.

12. The construction according to claim 1, wherein the cell holder element is configured for holding a plurality of cell groups on at least one cell side, wherein the cell groups have in each case a plurality of battery cells;
wherein the sensor element when mechanically connecting the cell holder element and the assembly body to the temperature sensor is disposed for measuring the temperature of two of the plurality of cell groups.

13. The construction according to claim 12, wherein the at least one cell side is a cell circumferential side, and the plurality of battery cells are elongate, round battery cells.

14. The construction according to claim 2, wherein the cell holder element is configured for receiving a further cable portion of the number of sensor cables that is different from the cable portion;
the construction has at least one securing unit, and the cell holder element and the securing unit are configured for mechanically connecting to one another, and when mechanically connecting the cell holder element and the securing unit to one another, are configured for securing in a form-fitting manner the received number of sensor cables in relation to a movement out of the cell holder element.

15. The construction according to claim 14, wherein the at least one securing unit is a voltage pickup cable harness.

16. A battery pack for supplying an electrically powered garden and/or forest tending apparatus with an electric power output, comprising:
a construction according to claim 1; and
at least one battery cell.

17. The battery pack according to claim 16, wherein the at least one battery cell is an elongate, round cell.

18. The battery pack according to claim 16, further comprising:
a measurement electronics part, wherein the measurement electronics part is configured for electrically connecting to the sensor element by way of the number of sensor cables for measuring the temperature of the at least one battery cell.

19. A garden and/or forest tending system, comprising:
a battery pack according to claim 16; and
an electrically powered garden and/or forest tending apparatus, wherein
the battery pack and the electrically powered garden and/or forest tending apparatus are configured for electrically connecting to one another in order to supply the electrically powered garden and/or forest tending apparatus with the electric power output from the battery pack.

20. A construction for a battery pack that supplies an electrically powered garden or forest tending apparatus with an electric power output, comprising:
at least one temperature sensor having a sensor head, wherein for measuring a temperature of at least one battery cell the sensor head contains a sensor element and a number of sensor cables contiguous to the sensor head;
at least one assembly body,
wherein the assembly body defines a head disposal region for disposing the sensor head,
wherein the assembly body defines a cable disposal region contiguous to the head disposal region for disposing a cable portion of the number of sensor cables,
wherein the assembly body has at least one head securing element having a cable conduit, wherein a conduit width of the cable conduit is larger than or equal to a cable width of the disposed cable portion and smaller than a head width of the disposed sensor head such that the at least one head securing element is configured for securing in a form-fitting manner the sensor head disposed in the head disposal region in relation to a movement in a direction of the cable disposal region,
wherein the assembly body has at least one cable securing element, wherein the at least one cable securing element for securing the cable portion disposed in the cable disposal region in relation to a movement is configured for securing the sensor head disposed in the head disposal region in relation to a movement in a counter direction out of the head disposal region,
wherein the assembly body is made as a single piece, and
a cell holder element, wherein the cell holder element and the assembly body together with the temperature sensor are configured for directly mechanically connecting to one another,
wherein the cell holder element is configured for holding at least one battery cell on at least one cell side,
wherein the temperature sensor, the assembly body, and the cell holder element are different,
wherein the at least one head securing element and the at least one cable securing element are different,
wherein the cell holder element, when mechanically connecting the cell holder element and the assembly body to the temperature sensor, is configured for securing in a direct form-fitting manner the sensor head disposed in the head disposal region in relation to a movement out of the head disposal region, wherein the head disposal region, the cable disposal region, and the cable conduit are continuously open through to outside of the assembly body, and, wherein the assembly body is configured so as to be integral.

21. A construction for a battery pack that supplies an electrically powered garden or forest tending apparatus with an electric power output, comprising:

at least one temperature sensor having a sensor head, wherein for measuring a temperature of at least one battery cell the sensor head contains a sensor element and a number of sensor cables contiguous to the sensor head;

at least one assembly body,
wherein the assembly body defines a head disposal region for disposing the sensor head,
wherein the assembly body defines a cable disposal region contiguous to the head disposal region for disposing a cable portion of the number of sensor cables,
wherein the assembly body has at least one head securing element having a cable conduit, wherein a conduit width of the cable conduit is larger than or equal to a cable width of the disposed cable portion and smaller than a head width of the disposed sensor head such that the at least one head securing element is configured for securing in a form-fitting manner the sensor head disposed in the head disposal region in relation to a movement in a direction of the cable disposal region,
wherein the assembly body has at least one cable securing element, wherein the at least one cable securing element for securing the cable portion disposed in the cable disposal region in relation to a movement is configured for securing the sensor head disposed in the head disposal region in relation to a movement in a counter direction out of the head disposal region,
wherein the assembly body is made as a single piece, and a cell holder element, wherein the cell holder element and the assembly body together with the temperature sensor are configured for directly mechanically connecting to one another, wherein the cell holder element is configured for holding at least one battery cell on at least one cell side, wherein the temperature sensor, the assembly body, and the cell holder element are different, wherein the at least one head securing element and the at least one cable securing element are different, wherein the assembly body has at least one circumferential wall, wherein the cell holder element and the assembly body together with the temperature sensor are configured for introducing the assembly body into the cell holder element in the counter direction, wherein the circumferential wall, for delimiting the introducing of the assembly body into the cell holder element, extends and is configured from the at least one head securing element in the counter direction, wherein the cell holder element, when mechanically connecting the cell holder element and the assembly body to the temperature sensor, is configured for securing in a direct form-fitting manner the sensor head disposed in the head disposal region in relation to a movement out of the head disposal region, wherein the head disposal region, the cable disposal region, and the cable conduit are continuously open through to outside of the assembly body, and further wherein at least one of:

(i) the circumferential wall, for securing in a form-fitting manner the sensor head disposed in the head disposal region in relation to a radial movement in at least one radial direction orthogonal to the direction, extends and is configured from the at least one head securing element in the counter direction, or (ii) the circumferential wall, for securing in a form-fitting manner the cable portion disposed in the cable disposal region in relation to a radial movement in at least one radial direction orthogonal to the direction, extends and is configured from the at least one head securing element in the direction.

* * * * *